United States Patent [19]

Treytl et al.

[11] 4,141,626

[45] Feb. 27, 1979

[54] METHOD OF AND APPARATUS FOR COLLECTING SOLAR RADIATION UTILIZING VARIABLE CURVATURE CYLINDRICAL REFLECTORS

[75] Inventors: William J. Treytl, San Jose; Arthur J. Slemmons, Los Gatos; Gerry B. Andeen, Menlo Park, all of Calif.

[73] Assignee: FMC Corporation, San Jose, Calif.

[21] Appl. No.: 801,671

[22] Filed: May 31, 1977

[51] Int. Cl.² ............................ G02B 5/10; F24J 3/02
[52] U.S. Cl. .................................. 350/295; 126/270; 350/289
[58] Field of Search ................... 350/292, 295, 289; 126/270, 271; 353/3

[56] References Cited

U.S. PATENT DOCUMENTS

| 412,724 | 10/1889 | Calver | 126/270 |
|---|---|---|---|
| 503,004 | 8/1893 | Severy | 126/270 |
| 603,317 | 5/1898 | Calver | 126/270 |
| 811,274 | 1/1906 | Carter | 126/271 |
| 1,951,404 | 3/1934 | Goddard | 350/295 X |
| 2,579,225 | 12/1951 | Borst et al. | 350/295 |
| 2,664,785 | 1/1954 | Roehrig | 350/295 X |
| 2,707,903 | 5/1955 | Trombe | 126/270 X |
| 2,982,179 | 5/1961 | Lace | 350/295 |
| 3,713,727 | 1/1973 | Markosian et al. | 126/271 X |
| 3,841,738 | 10/1974 | Caplan | 126/271 X |
| 3,861,379 | 1/1975 | Anderson, Jr. | 126/271 |
| 3,884,217 | 5/1975 | Wartes | 126/270 |
| 3,889,531 | 6/1975 | Suga | 126/270 X |
| 3,892,433 | 7/1975 | Blake | 126/270 X |
| 3,905,352 | 9/1975 | Jahn | 126/270 |
| 3,906,927 | 9/1975 | Caplan | 350/295 X |
| 3,915,147 | 10/1975 | Rineer | 126/271 |
| 4,022,523 | 5/1977 | Lindonen et al. | 350/295 |
| 4,033,676 | 7/1977 | Brantley, Jr. et al. | 350/295 |
| 4,046,462 | 9/1977 | Fletcher et al. | 350/295 |

OTHER PUBLICATIONS

Total Energy, Distributed Collector Systems and Research and Development Projects: Semiannul Report (26-27 Jan. 1976, Atlanta, Georgia) pp. 45-52 and 69-73.

*Primary Examiner*—F. L. Evans
*Attorney, Agent, or Firm*—R. S. Kelly; T. J. McNaughton

[57] ABSTRACT

A heliostat apparatus includes a frame which is rotatable about an axis which is parallel to the aperture plane of an elongate receiver. A plurality of flat flexible mirror elements are mounted to the frame between several parallel, uniformly spaced resilient beams which are pivotally connected at their ends to the frame. Channels are mounted to the sides of the beams for supporting the edges of the mirror elements. Each of the beams has a longitudinally varying configuration designed to bow into predetermined, generally circular curvatures of varying radii when the center of the beam is deflected relative to the pivotally connected ends of the beams. All of the parallel resilient beams are simultaneously deflected by a cam shaft assembly extending through openings in the centers of the beams, whereby the mirror elements together form an upwardly concave, cylindrical reflecting surface. The heliostat is rotated about its axis to track the apparent diurnal movement of the sun, while the reflecting surface is substantially simultaneously bowed into a cylindrical trough having a radius adapted to focus incident light at the plane of the receiver aperture.

11 Claims, 9 Drawing Figures

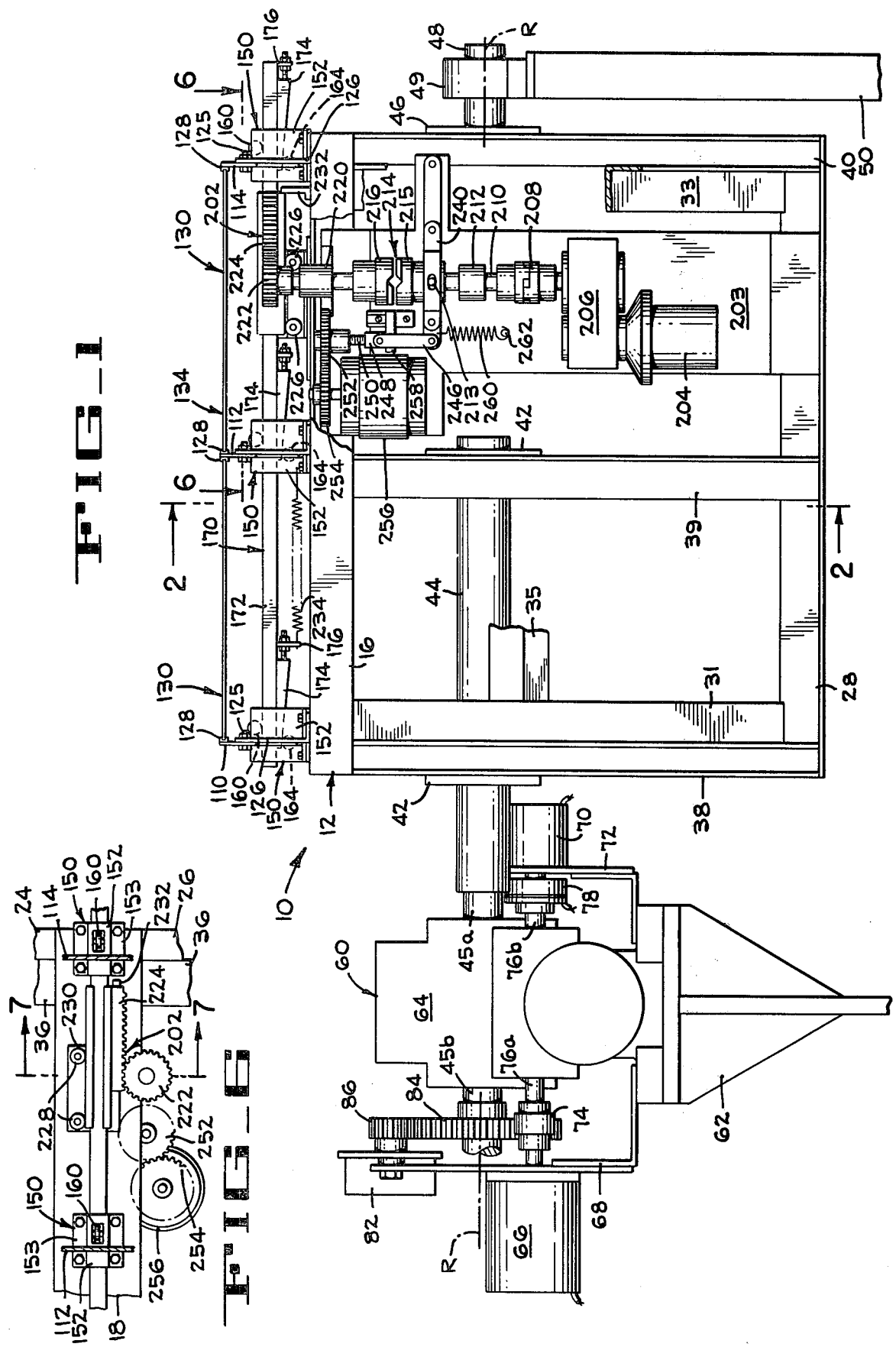

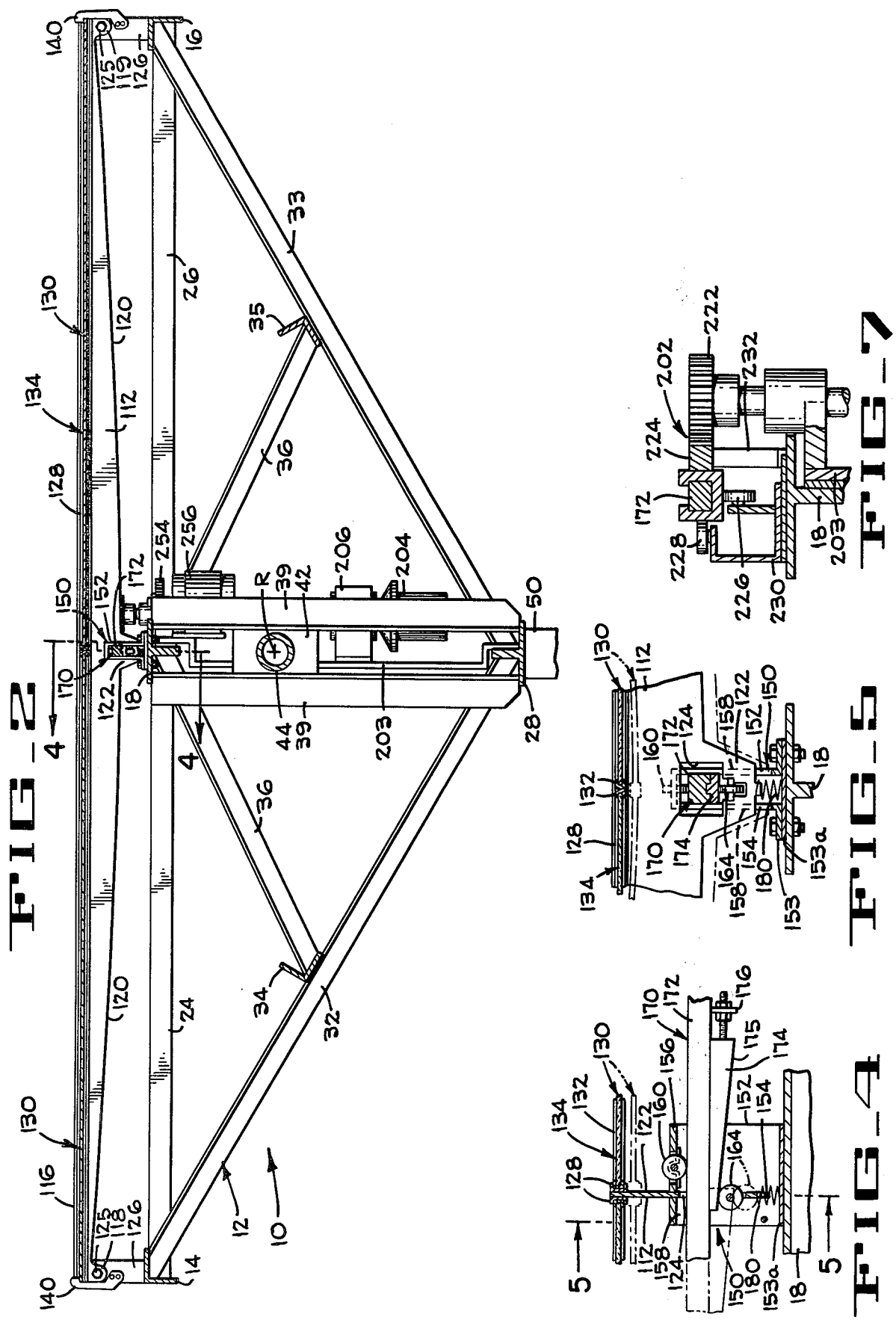

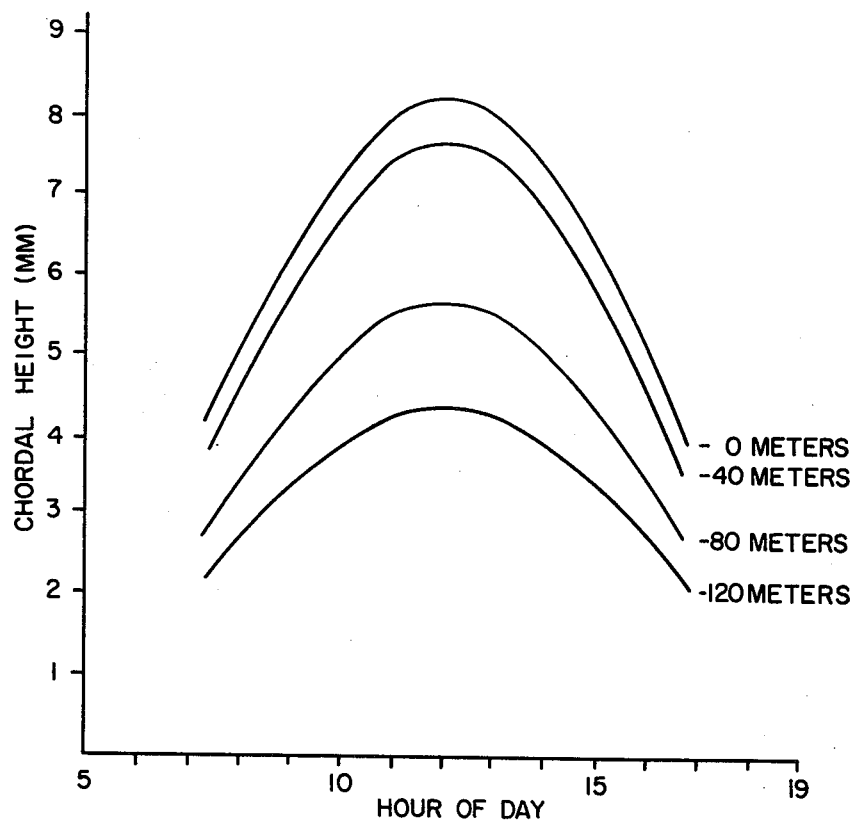
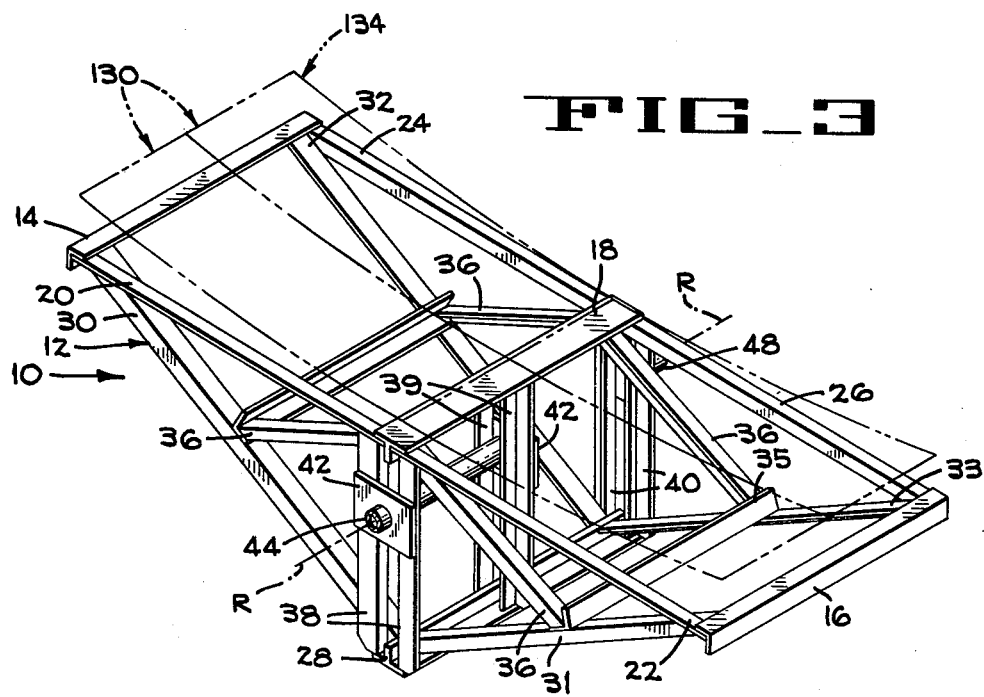

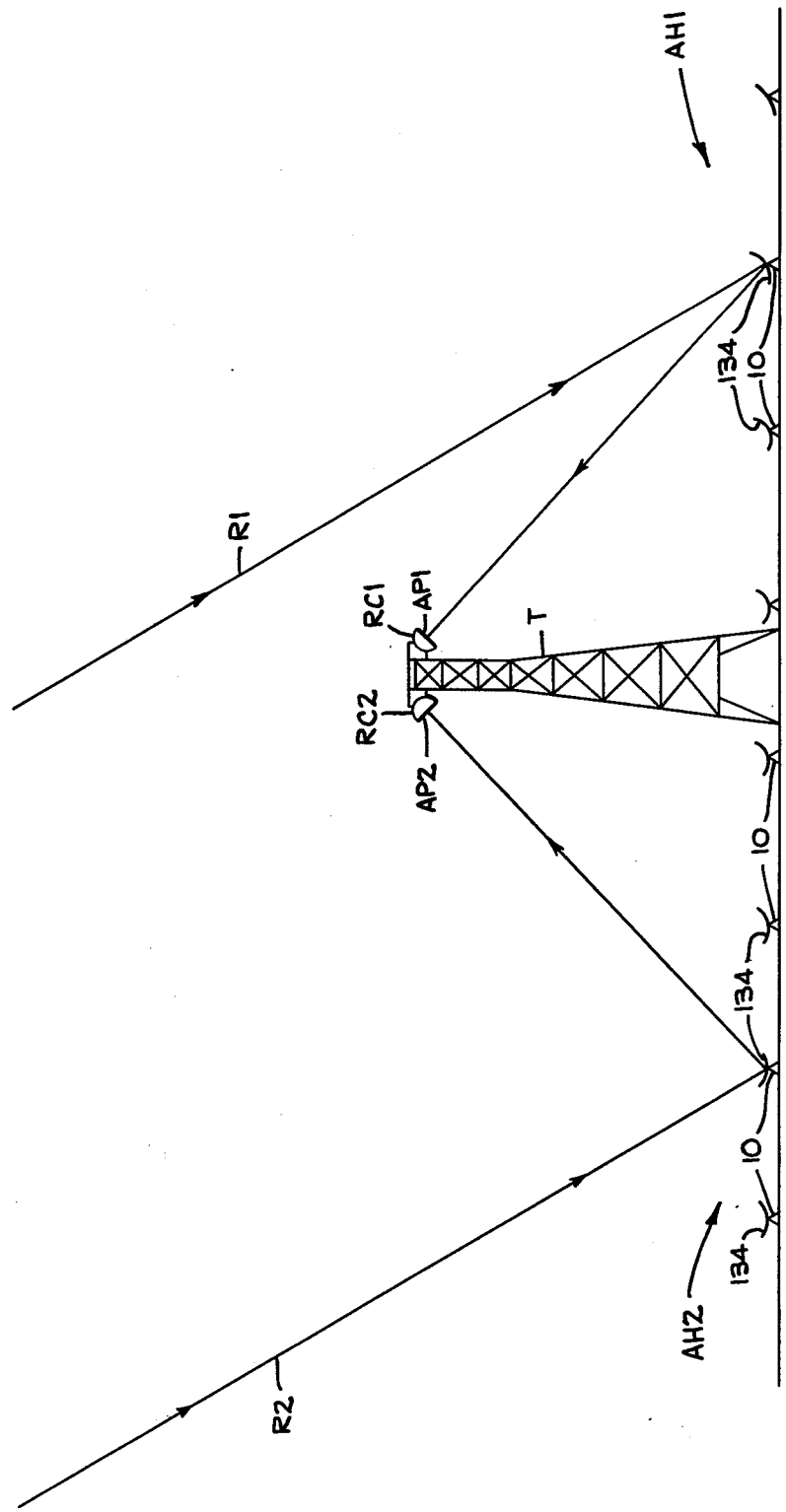

METHOD OF AND APPARATUS FOR COLLECTING SOLAR RADIATION UTILIZING VARIABLE CURVATURE CYLINDRICAL REFLECTORS

BACKGROUND OF THE INVENTION

1. Field of the Invention

The present invention generally relates to heliostats and more particularly concerns heliostats which include a cylindrical reflecting surface for focusing light on the elongate aperture of an elongate solar energy receiver.

2. Description of the Prior Art

U.S. Pat. No. 3,892,433 to Blake discloses a "point" type of central receiver system which includes a central light receiver and a fan-shaped array of heliostats surrounding the central receiver. Each heliostat includes a reflecting surface which is spherical and upwardly concave. The curvature of the reflecting surfaces of each heliostat is fixed and is chosen, among other parameters, according to the distance between the heliostat and the central receiver. The reflecting surface of each heliostat is mounted for pivoting orthogonally about a vertical axis through its center, to thereby permit general elevational and azimuth tracking of the sun. It is indicated in this patent that the heliostats do not accurately focus sunlight into the aperture of the receiver throughout the day. Rather, some inaccuracy is inherent in the system due to off-axis astigmatic errors in both focal planes of the reflecting surfaces which result from the fixed radius of curvature of the individual reflecting surfaces and the fixed mode of orthogonal rotation.

A similar point type of central receiver system, which has been studied by the Georgia Institute of Technology, is disclosed at pages 69–73 of the publication entitled, "Total Energy, Distributed Collector Systems and Research and Development Projects" published by the Aerospace Corporation of El Segundo, Calif. on Mar. 26, 1976 for the United States Energy Research and Development Administration in connection with ERDA Contract No. E(04-3)-1101. The system as described therein includes heliostats arranged in a hexagonal field about the central receiver. Each heliostat includes a flat circular mirror bent into a fixed curved form by a bending device, which device is not specifically described. The individual mirrors are, as in the system of the aforenoted Blake patent, held at fixed radii dependent upon their respective distances from the central receiver. As with the heliostats of the Blake patent, the heliostats disclosed in this publication will also be subject to focusing errors resulting from off-axis astigmatism.

U.S. Pat. No. 3,861,379 to Anderson discloses a receiver system, which may be broadly considered to be a small scale, line type of central receiver system. In a line type of central receiver system, the receiver is elevated relative to a field of heliostats and is elongated along an axis which is oriented in a selected direction. In the line type of system the heliostats have cylindrical or rectangular reflecting surfaces which are mounted for rotation about axes which are parallel to the axis of the central receiver. The system of the Anderson patent includes a central cylindrical receiver fixedly mounted to a framework and a plurality of parallel, elongate reflectors, each having flat rectangular shapes, which are rotatably mounted to the framework. The patent indicates that the reflectors may have cylindrical or parabolic cross-sections.

U.S. Pat. No. 3,884,217 to Wartes shows a distributed receiver system which is similar to the system of the Anderson patent. The Wartes patent discloses a mechanism for rotating the mirrors thereof into defocused positions in the event that the mirrors need protection from the elements (hail, sand, etc.) or when the central receiver is in an overheated condition.

U.S. Pat. No. 3,915,147 to Rineer discloses a system in which two rigid reflector members, which together form a trough-shaped reflector, are shifted into a defocused orientation with respect to the associated receiver when said receiver needs to be cooled below the condensation point of the heat transfer fluid therein.

As indicated by the Rineer, Blake, and Wartes patents, the conventional method of providing defocusing of incident light comprises changing the relative orientation of rigid reflectors relative to the receiver, rather than bending the reflectors themselves into defocused configurations.

SUMMARY OF THE INVENTION

A principal object of the present invention is to provide a method of collecting solar radiation on a elongate aperture of a solar receiver which eliminates concern about off-axis astigmatic focusing errors. The method generally comprises the steps of concurrently rotating several reflectors about transversely spaced, fixed axes which are parallel to the receiver aperture so as to generally continuously direct the solar radiation incident thereon toward the aperture as the sun changes its position in the sky, and substantially simultaneously with such concurrent rotation, bending the several reflectors into various different cylindrical curvatures with the curvatures of the respective reflectors being set according to the off-axis angle between the incident radiation and a plane which is normal to their fixed axes of rotation and also according to the particular distances between the respective reflectors and the solar receiver.

Another principal object of the present invention is to provide an apparatus for focusing light on an elongate aperture of a solar receiver such apparatus comprising a frame which is rotatable about an axis to track the apparent movement of the sun, a flexible reflector, and a mechanism for mounting the reflector to the frame to form a cylindrical reflecting surface having a variable curvature in a plane normal to the axis of rotation thereof. The frame is rotated to track the apparent diurnal movement of the sun, while the curvature of the reflector is changed to focus incident radiation upon the elongated receiver aperture.

Another object of the present invention is to provide a solar-thermal power system which utilizes an elongated central solar receiver and a plurality of reflector apparatuses as aforedescribed with each individual reflector apparatus being generally continuously adjusted to accomplish the desired tracking of the sun.

The reflector mounting mechanism preferably includes resilient deflection beams for supporting the edges of flat flexible mirrors and a mechanism for concurrently deflecting the centers of each of the beams and thereby bending the mirrors to form a cylindrical trough having a variable curvature which is dependent on the amount of deflection of the centers of the beams. The amount of deflection of the beams is determined according to the off-axis angle between the incident radiation and the normal plane of the cylindrical mirror and also the distance between the reflector and the plane of the receiver aperture.

In a preferred embodiment of the heliostat apparatus of the present invention, the rotatable frame includes two structural members extending parallel to the axis of rotation of the frames, and the parallel deflection beams are mounted transversely between the two structural members, with the ends of the beams being pivotably connected to the two structural members. The transverse edges of the flat mirrors are slidably retained in channels affixed to the sides of the beams. A cam rod extends through openings in the centers of the respective deflection beams, and a plurality of cam elements are mounted on the cam rod for deflecting the beams into upwardly concave configurations. The cam rod is driven to cause the cam elements to deflect the beams in unison into the selected amount of curvature.

BRIEF DESCRIPTION OF THE DRAWINGS

FIG. 1 is a side elevational view of the heliostat apparatus of the present invention, the mirror retaining clips (shown in FIG. 2) having been removed for the sake of clarity.

FIG. 2 is a reduced sectional view of the heliostat apparatus taken on line 2—2 of FIG. 1.

FIG. 3 is a perspective view of the rotatable frame of the heliostat apparatus shown in FIGS. 1 and 2, the variable curvature, cylindrical reflecting surface of the heliostat being diagrammatically depicted in dashed outline.

FIG. 4 is an enlarged section taken on line 4—4 of FIG. 2.

FIG. 5 is a section taken on line 5—5 of FIG. 4.

FIG. 6 is a section taken on line 6—6 of FIG. 1.

FIG. 7 is an enlarged section taken along line 7—7 of FIG. 6.

FIG. 8 is a diagrammatic, end elevational view of a central receiver, solar-thermal power system which employs the heliostat apparatus of the present invention.

FIG. 9 is a graph illustrating the relationship of the chordal heights of the cylindrical reflecting surfaces of various heliostats in the array of the central receiver system of FIG. 8.

DESCRIPTION OF THE PREFERRED EMBODIMENTS

Referring now more particularly to FIGS. 1-3 of the drawings, it will be seen that the heliostat apparatus 10 of the present invention includes a truss-like frame 12 (FIG. 3) which is rotatable about an axis of rotation R—R. The frame 12 includes a rectangular top section comprised of a central transversely extending beam 18; two transversely extending rails 14 and 16 which form the short sides of the rectangular section; two longitudinally extending and aligned rails 20 and 22 connecting one end of the rail 14 to the beam 18 and one end of the rail 16 to the beam 18, respectively, and together forming one long side of the rectangular section; and two further aligned rails 24 and 26 connecting the other ends of the rails 14 and 16 to the central beam 18 and forming the other long side of the rectangular section. The frame 12 further includes a truss section comprising an inverted T-shaped beam 28 at the apex of the truss section (extending in spaced parallel relationship to beam 18) and diagonally extending rails 30, 31, 32, and 33 which connect the ends of the beam 28 to the ends of the side rails 14 and 16. Two further bracing rails 34 and 35 extend between the centers of opposing diagonal rails 30 and 32 and rails 31 and 33, respectively. Finally, four short braces 36 are connected between the ends of central beam 18 and the centers of diagonal rails 30–33.

A pair of spaced parallel rails 38 are connected at one side of the frame respectively between the rails 20 and 22 adjacent central beam 18 and the beam 28. Another pair of spaced parallel rails 39 is connected between the center beam 18 and the beam 28 at the center of the frame structure. A further pair of spaced parallel rails 40 is connected at the other side of the frame between the rails 24 and 26 and the beam 28. A cylindrical sleeve 44 is affixed to the parallel rails 38 and 39 by plates 42, the sleeve being mounted to coaxial with the desired axis of rotation R—R of the frame 12. A plate 46 (FIG. 1) having a stub shaft 48 mounted thereon is connected to the pair of rails 40, with the stub shaft also being coaxially aligned with the axis of rotation R—R. The sleeve 44 receives, and is pinned to, one end 45a (see FIG. 1) of a double-ended drive shaft of a frame drive assembly 60, while the fixed stub shaft 48 is permitted to freely rotate in a bearing element 49 which is secured to a rigid support frame member 50 (shown in part in FIG. 1).

The frame drive assembly 60 is mounted to a fixed support frame 62 (shown in part in FIG. 1) and includes a gear reduction device 64, a stowing motor 66 mounted by a bracket 68 to the frame 62, and a tracking motor 70 mounted by a bracket 72 to the frame 62. The stowing motor 66 is coupled by a coupling 74 to one end 76a of a double-ended input shaft of the gear reduction device 64. The tracking motor 70 is connected through an electrically operated clutch 78 to the other end 76a of the double-ended input shaft of the gear reduction device 64. The tracking motor 70 may be a conventional bi-directional D.C. stepper motor capable of 200 steps per revolution. The stowing motor 66 may be a conventional A.C. induction motor capable of operating at 1250 RPM. The gear reduction device 64 has a gear ratio of 5,000:1 and has an output shaft having two ends 45a and 45b (the latter being broken away in FIG. 1). As previously stated, the shaft end 45a is anchored within the sleeve 44 extending from the heliostat frame 12. The other end 45b of the output shaft may be connected to another (non-illustrated) heliostat frame 12 to concurrently drive such other frame. A shaft encoder 82 is shown as being mounted above the stowing motor 66, and a gear 84 is mounted on the output shaft end 45a to engage a gear 86 attached to the input shaft of the shaft encoder.

The heliostat 10 further includes an adjustable reflector assembly which is mounted to the upper rectangular section of the frame 12 and includes three uniformly spaced, parallel, resilient deflection beams 110, 112, and 114 and a plurality of mirror elements 130 mounted to such deflection beams. The deflection beams 110–114 are formed from resilient sheet material, such as ⅛ inch aluminum and extend parallel to the side rails 20–26 of the frame with their flat surfaces being oriented vertically. Each of the beams has a straight top edge 116 (FIG. 2), downwardly extending projections 118 and 119 at its end, a bottom edge 120 which has a compound hyperbolic curvature that is symmetrical about the center of the beam, and a downwardly extending projection 122 at the center of the beam (FIG. 5). Apertures are provided in the end projections 118 and 119, and an opening 124 (FIG. 5) is provided through the center of each beam. The resilient deflection beams are formed such that when the center of a beam is transversely deflected relative to the end of the beam, the beam will bow in a manner such that the straight top edge 116 will deform generally into an arc of a circle. The curvature of the beam at different amounts of center deflection will be understood to depend on the longitudinally variance in elastic stiffness—which is dependent on the longitudinal variance in cross-section of the beam.

The end projections 118 and 119 of the deflection beams 110, 112, 114 are pivotally attached by bolts 125 (FIG. 2) to L-shaped brackets 126 which are affixed to the respective end rails 14 and 16 of the frame 12. Channels 128 (FIG. 1) having a U-shaped cross-section for receiving the long edges of rectangular mirror elements 130 are welded to the sides of the deflection beams adjacent the top edges 116 thereof. More specifically, the deflection beams 110 and 114 at the sides of the heliostat 10 have channels 128 mounted to their inner side surfaces, and the central deflection beam 112 has a channel 128 mounted on each side surface thereof. The channels 128 slidingly receive rectangular mirror elements 130 with the long edges of the mirror elements 130 being contained within opposing channels of adjacent deflection beams.

A preferred form of mirror element 130 is comprised of a 20 inch by 60 inch second surface glass mirror which is 1/16-inch thick and leaving a ¼-inch protection layer of polystyrene foam insulation (not shown) glued by a soft adhesive to the silvered back surface thereof with a steel channel 132 (FIGS. 4 and 5) surrounding the edges of the composite glass and foam structure. Two of such mirror elements 130 are retained end-to-end between adjacent deflection beams, thus providing a composite reflecting surface 134 (FIG. 3) of a mosaic form, which is 40 inches wide by 120 inches long. The short inner ends of the mirror elements 130 are in abutment (FIG. 5) at the centers of deflection beams 110–114, and the short outer ends of the mirror elements are aligned with the ends of the deflection beams. To retain the two longitudinally aligned mirror elements between adjacent opposing channels 128, several clips 140 are employed (two only being shown in FIG. 2). The clips 140 are bolted to the brackets 126.

The centers of the deflection beams 110, 112, 114 are guided by cam shoe assemblies 150 (FIGS. 4 and 5) which permit the respective beams to be deflected in a transverse direction which is normal to the axis of rotation R—R of the reflecting surface 134. The cam shoe assemblies 150, as shown in FIGS. 1, 2 and 4–6 each include a bracket 152 having lower flanges 153 bolted to the central beam 18 of the frame 12. A spacer plate 153a is shown to be retained between each bracket 152 and the central beam 18 (FIG. 5). The brackets 152 have an inverted U-shaped cross-section and are arranged to receive a cam shaft assembly 170. A slot 154 is formed transversely through the top wall 156 of each bracket and extends to the bottoms of the side walls 158 of each bracket. The slot 154, as shown in FIGS. 4 and 5, receives the central projection 122 of the associated deflection beam. The slot 154 permits each deflection beam to move in a direction normal to the plane containing the axis of rotation R—R and yet prevents the beam from being deflected in a sideways or lateral direction, i.e., in a direction parallel to the center beam 18.

The center openings 124 of the deflection beams 110–114 register with the respective, longitudinally extending openings formed by the top and side walls of the respective brackets 152. The cam shaft assembly 170 extends through the openings of the braclets 152 and the openings 124 in the respective deflection beams. Guide rollers 160 (FIG. 4) are mounted to the top walls 156 of the brackets 152 in a manner such that the shafts of the rollers 160 are oriented transversely relative to the cam shaft assembly 170. The top of each roller 160 extends upwardly through an opening in the top wall 156 of the respective bracket (FIG. 4). The guide rollers 160 provide bearings for the adjacent upper surfaces of the cam shaft assembly 170. A cam follower roller 164 is mounted in the center projection 122 of each deflection beam at the bottom of the center opening 124 thereof, with the shaft of roller 164 being mounted parallel to the wall of the respective deflection beam (FIG. 5). The cam follower rollers 164 provide low-friction bearings for the adjacent linear camming surfaces of the cam shaft assembly 170.

As shown in FIG. 1, 2, 4 and 5, the cam shaft assembly 170 comprises a rectangular shaft 172 and three linear cam elements 174 mounted against the bottom surface of the shaft 172 at uniform spacings corresponding to the spacings between the three deflection beams 110–114. The cam elements 174 are wedge-shaped, with the linear camming surfaces 175 (FIG. 4) thereof having a slope selected according to the desired amount and rate of deflection of the deflection beams 110–114. Each of the cam elements 174 has a longitudinally extending rib formed on the upper surface thereof which is received within a groove formed longitudinally in the bottom surface of the shaft 172 (see FIG. 5), and each cam element is adjustably bolted to a stub 176 extending from the bottom of the shaft 172 (FIG. 4) so that its position on the shaft can be varied.

It will be seen from FIGS. 4 and 5 that as the shaft 172 is longitudinally shifted in the associated beam openings 124, the cam follower rollers 164 will be pushed down to downwardly deflect the centers of the deflection beams 110–114 relative to the ends thereof. That is to say, each deflection beam is deflected such that the mirror-mounting channels 128 attached thereto are bent into upwardly concave configurations which are each generally in the form of an arc of a circle with the radius of the arc being variable and dependent on the amount of deflection of the center of the beam. The phantom lines in FIGS. 3, 4, and 5 illustrate a downwardly deflected and focused configuration of the mirror elements 130. FIGS. 4 and 5 illustrates the camming action of the shaft assembly 170 on one of the deflection beams (beam 112). The cam elements 174 are spaced on the shaft 172 to cause equal deflection of each of the deflection beams, in unison, as the shaft assembly 170 is shifted. The reflecting surface 134 composed of the mirror elements 130 (FIG. 3) will thus be deflected downwardly into a cylindrical trough having a cross-sectional configuration corresponding to the curved shape of the mirror-mounting channels.

Each cam shoe assembly 150 (FIGS. 4 and 5) further includes a spring 180 with the top end of the spring being engaged in a pilot projection at the bottom of the deflection beam projections 122 and with the bottom end of the spring abutting against the spacer 153a atop the central beam 18 of the frame 12. The springs 180 apply upward forces on the centers of the beams. The reflecting surface 134 will be forced by the springs 180 into a slightly upwardly convex, defocused configuration when the cam shaft assembly 170 is in a retracted position relative to the cam follower rollers 164. This defocused configuration is rapidly attained when the mirror drive assembly of the heliostat 10 (to be described hereinafter) is disengaged in the event of a power failure in the control system or overheating of the receiver.

As illustrated in FIGS. 1, 2, 6, and 7, the heliostat 10 includes a mirror drive assembly which operates the cam shaft assembly 170 by means of a rack and pinion assembly 202. The mirror drive assembly includes an upstanding support member 203 connected to the central beam 18 and the lower beam 28 of the frame 12. A drive motor 204 (FIG. 1)—again, a bi-directional D. C. stepping motor—and a gear reduction device 206 driven by the motor 204 are mounted to the face of the support member 203. The output shaft of the gear reduction device 206 is flexibly joined through a coupling 208 to a further shaft 210 which rotates in a bearing 212 mounted to the support member 203. The shaft 210 is joined to the lower jaw 215 of a clutch 214. The upper jaw 216 of the clutch 214 has a shaft extending therefrom through another bearing 220, and the pinion 222 of the rack and pinion assembly 202 is attached to the upper end of such shaft.

As best shown in FIGS. 6 and 7, the pinion 222 engages a rack 224 which is mounted upon the shaft 172 of the cam shaft assembly 170. The bottom surface of the mounting bracket for the rack 224 (FIG. 7) rides on a pair of rollers 226, and the back surface of such mounting bracket rides against another pair of rollers 228 (FIG. 6). Both pairs of rollers 226 and 228 are mounted to a bracket 230 (FIG. 7) which is fastened to the central beam 18 of the frame 12. A stop member 232 (FIG. 1) is mounted to the central beam 18 to stop the movement of the shaft 172 in its full retracted position.

A return spring 234 (FIG. 1) is attached between the center one of the shoe assemblies 150 and one of the stubs 176 attached to the shaft 172. The spring 234 is provided to quickly retract the cam shaft assembly 170 from the respective cam shoe assemblies 150 when the clutch 214 of the mirror drive assembly is in a disengaged mode and thus no power is being applied by the drive motor 204. Thus, when the clutch 214 is opened, the return spring 234 will retract the cam elements 174 to cause the deflection beams 110-114 to spring from their upwardly concave, focused configurations to their upwardly convex, defocused configurations under the upward pressure exerted by the springs 180. It will also be understood that the deflection beams 110-114 are resilient and thus will have a strong tendency to return to their original shape.

The lower jaw 215 of the clutch 214 is operated by a lever arm 240 (FIG. 1) having one end pivotally attached to the support member 203 and its other end pivotally connected by a pin to a pair of spaced parallel links 246 (one only shown in FIG. 1). The lower jaw 215 of the clutch has a pair of projecting pins (one only shown in FIG. 1) which extend radially therefrom. The lever arm 240 has a yoke portion surrounding the lower jaw 215, and slots are formed in the yoke portion for receiving the pair of pins 213. The links 246 are pivotally attached to stub shafts extending from the lower end of a ballnut 248 which is driven by a ballscrew 250. The ballscrew 250 is connected to the hub of a gear 252 which engages the drive gear 254 of a torque motor 256.

When the torque motor 256 is de-energized, the ballnut 248 is pulled downwardly to a position (shown in FIG. 1) abutting against a stop member 258 which is fastened to the face of the support member 203, be a spring 260 which is anchored to a stud 262 also affixed to the face of the support member 203. The torque motor 256 is capable of operating in a continuous stalled condition to keep the ballnut 248 in a raised position and to thus hold the lever arm 240 in an elevated position causing the clutch 214 to remain in an engaged mode. When the clutch jaws are engaged, the stepping motor 204 is operable to control the curvature of the composite reflecting surface 134. When the torque motor 256 is de-energized, e.g., when power to the motor 256 is cut off due to a power failure, the clutch 214 is quickly opened by the spring 260 acting on the lever arm 240 to disengage the lower jaw 215 of the clutch. Then, the return spring 234 quickly retracts the cam shaft assembly 170 from the cam shoe assemblies 150 thereby permitting the deflection beams 110-114 to deflect upwardly and permitting the springs 180 to force the beams into their upwardly convex configurations.

The control circuitry, not illustrated herein, for controlling the frame drive assembly will be obvious to one skilled in the art. Generally, the bi-directional D.C. stepping motors 70 and 204 of both drive assemblies are controlled by translators which, in turn, may be controlled by a mircoprocessor. The microprocessor is programmed in a known manner to compute the required inclination angles of the reflecting surface 134 of the heliostat according to (1) the known azimuth and elevation angles of the sun (at the geographical site of the heliostat) throughout the day, (2) the orientation of the receiver, and (3) the position of the heliostat relative to the receiver. The inclination angle is the angle between the normal plane of the reflecting surface 134 and a vertical plane through the centerline of the reflecting surface 134 (i.e., where the mirror elements 130 abut above the central beam 18). Signals from the encoder 82 are fed to and processed by the microprocessor to provide output signals to the translator connected to the motor 70, thereby rotating the frame 12 a selected amount and thus adjusting the inclination angle of the reflecting surface 134. The microprocessor is also programmed to compute the various radii of curvature of the composite reflecting surface 134 according to the basic parameters generally described hereinafter. Signals are transmitted from the microprocessor to the translator connected to the mirror drive motor 204 to substantially simultaneously control the frame drive motor 70 and the mirror drive motor 204 and thus substantially simultaneously change the curvature and the inclination of the reflecting surface 134 to obtain optimal focusing of the incident radiation into the aperture of the receiver.

The microprocessor of the control circuitry also provides an output signal for controlling the clutch 78 which couples the motor 70 to the input end 76b of the double-ended shaft of the gear reduction device 64. In the event of a sand storm or hail storm, for example, the motor 66 would be operated to quickly rotate the interconnected heliostat frame 12 into an orientation wherein the foam layer on the back of the mirror elements 130 affords some protection to the glass of the mirror elements. When the motor 66 is operated, it will be necessary to provide a signal to disengage the clutch 78 to prevent the high speed rotation of the gear reduction shaft from ruining the stepping motor 70. Finally, the microprocessor of the control circuit is programmed to provide output signals for controlling the torque motor 256 to lift the lever arm 240 and engage the clutch 214 when power is being supplied to drive the various motors of the heliostat but to deactivate the torque motor 256 when an overheating condition occurs in the receiver.

As diagrammatically illustrated in FIG. 8, a preferred application for the heliostat 10 of the present invention is in a line type of solar-thermal central receiver system which includes a tower structure T and a pair of receivers RC1 and RC2 mounted on the top of the tower structure. Examples of such line type receivers are found in the prior art and are well known to those skilled in the art. The tower T and receivers RC1 and RC2 are elongated and are preferably oriented with the longitudinal axes extending in an east-west direction. The receivers RC1 and RC2 have elongate apertures AP1 and AP2, respectively. The receivers are oriented such that their apertures are outwardly tilted from the vertical at approximately 45° angles. A first array AH1 of heliostats 10 is arranged on the north side of the tower T to concentrate solar radiation on the associated north receiver RC1. A second array AH2 of heliostats 10 is arranged on the south side of the receiver RC2.

The heliostats 10 in each of the arrays AH1 and AH2 are also oriented in an east-west direction. Referring to FIGS. 3 and 8, this means, of course, that the axes of rotation R—R of the heliostats 10 are parallel to the apertures of the receivers RC1 and RC2. The heliostats 10 are shown to be uniformly spaced in the north-south direction; in practice, the heliostats are spaced such that, at a selected time, each array presents a continuous mirror surface to the sun, with no shading of any reflecting surfaces. As generally indicated in FIG. 8, the reflecting surface 134 of each heliostat 10 is rotated about the heliostat's axis of rotation to an angle of inclination adapted to direct the radiation incident thereon generally into the associated aperture AP1 or AP2. As also shown in FIG. 8 with reference to sun rays R1 and R2, the third heliostat in the north array AH1 is relatively steeply inclined to direct the incident radiation (represented by the ray R1) back toward the aperture AP1 of the receiver RC1. The third heliostat in the south array AH2 is slightly inclined, in the opposite direction from vertical relative to the direction of inclination of the aforementioned heliostat, to direct the incident radiation (represented by ray R2) to the aperture AP2 of the receiver RC2.

As previously discussed, the mirror elements 130 of each heliostat are bowed generally simultaneously to form a composite cylindrical reflecting surface 134 having a generally circular cross-section in the transverse plane of the reflecting surface (i.e., the transverse plane being perpendicular to the longitudinally extending normal plane of the cylindrical reflecting surface 134). The radius of curvature of each of the reflecting surfaces 134 of the heliostats 10 of each array is selected according to the distance between the reflecting surface 134 of the particular heliostat and the plane of the associated aperture and the off-axis angle of the incident radiation. The off-axis angle is the angle between the line projecting in the transverse plane of the reflecting surface of an incident ray and the mirror normal plane.

As previously indicated, prior art central receiver systems have generally employed heliostats having upwardly concave reflective surfaces which have selected, but fixed, curvatures and which are rotated to different angles of inclination to track the apparent diurnal movement of the sun. The fixed curvatures of the reflecting surfaces of the prior art heliostats will result in off-axis astigmatism. For example, if one were to assume that the reflecting surfaces 134 of the heliostats 10 have fixed (rather than variable) cylindrical curvatures, the incident solar radiation would be focused for maximum concentration only at one or two times of the day when the off-axis angle of incident radiation is equal to the off-axis angle for which the fixed heliostat curvature is designed. At such time or times of day the reflected light will generally converge at a focal line which lies in the plane of the aperture. However, as the off-axis angle between the incident radiation and the normal plane of the fixed curvature reflecting surface changes, the reflected radiation will generally converge at a focal line which is displaced from the aperture plane, thereby causing an undesirable dispersion of the reflected radiation.

In contrast, the curvature of the reflecting surface 134 of the heliostat of the present invention is variable with the rotation thereof to maintain accurate concentration of sunlight on the respective apertures AP1 and AP2 (FIG. 8) throughout the day. As the angle between the incident radiation and the normal plane changes during the day, the radius of curvature of each heliostat is changed to maintain accurate focusing without any off-axis astigmatism, i.e., to maintain the focal line of the cylindrical reflecting surface 134 in the plane of the respective receiver aperture throughout the day.

FIG. 9 graphically illustrates the relationships between the amount of concave curvatures of the reflecting surfaces 134 of the several heliostats in the north array AH1 of heliostats. It is assumed that the aperture AP1 is 1.22 meters wide, that the mirrors are 3.05 meters wide, that the heliostats are situated at a latitude of 35° north, and that the day of the year is winter solstice. Curves are generated in FIG. 9 for heliostats which are spaced at 0, 40, 80, and 120 meters from the aperture, with such distances being measured horizontally between a vertical plane through the center of the respective aperture and the axes of rotation R—R of the four heliostats. The coordinates of the graph of FIG. 9 are the time of day and the chordal height of the reflecting surface 134. Chordal height is the distance, measured in normal plane of the cylindrical surface 134, between the bottom center of the reflecing surface and a plane through the longitudinally extending ends of the reflecting surface.

It should be noted that FIG. 9 indicates that the reflecting surfaces of the four heliostats in the north array AH1 undergo about a two-fold or greater increase in chordal height from the start to the middle of a solar day. This variation is especially great due to the large variation in the off-axis angles of the incident radiation at the solstices. During other days of the year the change in curvature of the reflecting surfaces will not be as great. At the equinoxes, the curvatures of the respective mirrors will remain constant, and thus only dependent on their respective distances from the associated aperture AP1, since during these days the off-axis angle of the sun remains constant.

Although the best mode contemplated for carrying out the present invention has been herein shown and described, it will be apparent that modification and variation may be made without departing from what is regarded to be the subject matter of the invention.

What is claimed is:

1. An apparatus for concentrating solar radiation into an elongate aperture of an elongate solar receiver comprising: a first frame; a second frame mounted to said first frame for rotation about a single fixed axis, said first frame being oriented such that said fixed axis of rotation of said second frame is parallel to the elongate aperture of an elongate solar receiver; means defining a flexible, rectangular reflecting surface; resilient means for mounting said reflecting surface means to said second frame such that said reflecting surface means is parallel to said axis of rotation; means for rotating said second frame to change the inclination angle of the reflecting surface means and to thereby track the sun during the apparent diurnal movement of the sun; and means, operatively connected to said resilient mounting means, for bending said reflecting surface means into a cylindrical trough having a variable curvature in a plane normal to said axis of rotation, said bending means including motor driven means for changing said curvature substantially simultaneously with the rotation of said second frame to accurately focus incident solar radiation into said aperture of the receiver at the various inclination angles of the reflecting surface means and at the various off-axis angles of the incident solar radiation relative to a plane which is normal to said fixed axis of rotation of the member.

2. The apparatus according to claim 1 wherein said means defining a flexible, rectangular reflecting surface includes a plurality of flat mirrors; said resilient means for mounting said mirrors to said second frame includes a plurality of resilient beams, means for mounting said beams to said second frame in spaced, parallel relationships, and means for securing said mirrors between adjacent beams; and said means for bending said reflecting surface into a cylindrical trough is operatively connected to said beams and causes said beams to bend in unison, whereby said mirrors secured between said beams are each deformed into a desired common cylindrical curvature.

3. The apparatus according to claim 2 wherein each of said resilient beams is constructed from sheet material having a longitudinally varying cross-section, said bending means is operatively connected to the centers of said beams; and the longitudinally varying cross-section of the beams is adapted to cause each beam to deform into a selected curvature when the center of the beam is deflected by said bending means.

4. An apparatus for focusing solar radiation on an elongate target such as an aperture of an elongate heat receiver, said apparatus comprising: at least one flat rectangular mirror member; a frame; means for mounting said mirror member to said frame to form a cylindrical reflecting surface which has a variable curvature and is parallel to the elongate target upon which incident solar radiation is to be concentrated, said mounting means including a pair of parallel resilient beams which are pivotally connected at their ends to said frame, means attached to said beams for securing said mirror member between said beams, each of said beams having an identical longitudinally varying configuration adapted to bow said mirror securing means attached thereto into varying cylindrical curvatures, and means operatively connected to said beams for simultaneously bowing said beams and thus said mirror member into said various desired cylindrical curvatures; and means for rotating said frame about an axis parallel to said elongate target.

5. The apparatus according to claim 4 wherein each of said resilient beams is made from sheet material, and each beam has a generally straight upper edge and a curved lower edge.

6. The apparatus according to claim 5 wherein each of said resilient beams have downwardly depending projections at the ends thereof which are pivotally mounted to said frame.

7. The apparatus according to claim 4 wherein said means for bowing said resilient beams comprises a cam rod extending transversely of said beams and operatively engaging said beams at the centers thereof for deflecting the centers of said beams toward said frame; and means for linearly moving said cam rod to force said beam centers toward said frame.

8. The apparatus according to claim 7 wherein said cam rod has wedge-shaped cam elements affixed to the lower surfaces thereof for respectively registering with portions of said resilient beams.

9. The apparatus according to claim 4 further comprising means for selectively disengaging said beam bowing means to permit said beams to achieve configurations wherein said cylindrical reflective surface is slightly upwardly convex.

10. A system for collecting solar radiation comprising a solar receiver having an elongate aperture for receiving reflected solar radiation; a plurality of heliostats disposed in spaced parallel relationships at at least one side of the solar receiver, with each of said heliostats comprising a frame, means for rotating said frame about a single fixed axis which extends parallel to said aperture of said receiver, a flexible rectangular reflecting member connected at a pair of opposite end edges to said frame, and means connected to said reflective member for bending said member into a cylindrical trough having a variable curvature in a plane normal to said fixed axis, said bending means including motor driven means for changing said curvature substantially simultaneously with the rotation of the reflecting member in accordance with the distance between each respective reflecting member and the off-axis angle of the incident radiation relative said normal plane; and means for concurrently operating said means for rotating each of said frames and said motor driven means for changing the curvature of each of said reflecting members, said operating means being operatively connected to the rotating means and bending means of all of the heliostats to adjust the inclination angles and amounts of curvature of the reflecting members of all of the heliostats substantially simultaneously so as to accurately focus solar radiation into said receiver aperture during various different times of the day.

11. A method of collecting sunlight on an elongate solar receiver comprising the steps of: providing several reflecting members; mounting the reflecting members for rotation about transversely spaced, fixed axes which are parallel to the elongate receiver; concurrently rotating the reflecting members throughout the solar day to generally continuously direct the sunlight incident upon the several reflecting members toward the receiver; and substantially simultaneously with the rotation of each of the reflecting members, bending each of the several reflecting members into various different cylindrical curvatures, with the curvatures of the respective reflecting members being set in accordance with the off-axis angle between the incident sunlight and a plane which is normal to said fixed axes of rotation of said reflecting members and also in accordance with the particular distances between the respective reflecting members and the receiver, whereby sunlight is accurately focused by each and every reflecting member onto the receiver without off-axis astigmatism.

* * * * *

UNITED STATES PATENT AND TRADEMARK OFFICE
CERTIFICATE OF CORRECTION

PATENT NO. : 4,141,626

DATED : February 27, 1979

INVENTOR(S) : WILLIAM J. TREYTL, ARTHUR J. SLEMMONS, GERRY B. ANDEEN

It is certified that error appears in the above—identified patent and that said Letters Patent is hereby corrected as shown below:

In Column 1 of the patent specification, immediately following the heading "Background of the Invention" insert:

> The Government has rights in this invention pursuant to Contract No. DE-AC03-76ET 20426 awarded by the U.S. Department of Energy.

Signed and Sealed this

Eighth Day of March 1983

[SEAL]

Attest:

GERALD J. MOSSINGHOFF

Attesting Officer     Commissioner of Patents and Trademarks